United States Patent Office 2,930,673
Patented Mar. 29, 1960

2,930,673

REMOVAL OF HYDROGEN SULFIDE FROM GAS MIXTURES

Herman S. Bloch, Skokie, and Vladimir Haensel, Hinsdale, Ill., assignors, by mesne assignments, to Universal Oil Products Company, Des Plaines, Ill., a corporation of Delaware No Drawing. Application June 27, 1957
Serial No. 668,328

7 Claims. (Cl. 23—3)

This invention relates to a process for treating a hydrogen sulfide contaminated gas mixture for the purpose of removing said hydrogen sulfide therefrom and to thereby produce an effluent gas substantially free of the hydrogen sulfide contaminant. More specifically, the invention concerns a process of the foregoing character which involves a treating agent which is highly effective for removing the hydrogen sulfide substantially completely in a relatively small number of stages and which may be readily regenerated for reuse in the separation stage.

In one of its embodiments this invention relates to a process for removing hydrogen sulfide from admixture with a gas which is substantially inert to the treating agent hereinafter specified which comprises contacting the gas mixture with a treating agent comprising a phosphate salt of a metal in the right hand columns of groups I and II of the periodic table and in the presence of water at a temperature and pressure sufficient to convert at least a portion of said metal phosphate salt to the sulfide salt of said metal and phosphoric acid and, thereafter, separately treating the resulting conversion product at a reduced temperature and pressure compared to the contacting step whereby metal phosphate separating agent is re-formed and hydrogen sulfide is released from the conversion product, withdrawing said hydrogen sulfide as an effluent from the latter zone and recycling the resulting regenerated metal phosphate salt to the first-mentioned contacting step.

In many organic conversion processes utilizing a gaseous reactant, particularly in certain processes for converting hydrocarbons, as in processes for the conversion of gasolines contaminated with organic sulfides, mercaptans and other sulfur-bearing undesirable impurities in the presence of hydrogen for the purpose of removing the latter sulfur compounds from the desired gasoline, it becomes essential for economy reasons to recycle the gaseous reactant, such as the aforementioned hydrogen, in order to maintain the molar ratio of gaseous reactant and the rate of conversion at a high level. In such processes release of the undesirable contaminant into the recycle stream results in a progressively greater contamination of the gas, accompanied by reduced conversion, as the proportion of contaminant in the recycle gas increases; that is, unless the recycle gas is separately treated prior to recycle to remove the undesirable contaminants. Thus, in a typical industrial application of the above principles certain naphtha fractions may be catalytically reformed in the presence of a platinum containing catalyst and in the presence of a molar ratio of hydrogen to hydrocarbon components of at least 2:1, generally up to about 10:1 to 20:1, and in this conversion process the sulfur-containing components generally present in the naphtha by virtue of being present in the crude petroleum stock, such as certain mercaptans, accompany the gasoline feed stock into the treating zone because they distill over with the desired fractions. In the presence of hydrogen and the aforementioned platinum catalysts, the sulfur-containing components of the naphtha produce hydrogen sulfide which is released into and mixes with the excess hydrogen to form a contaminated recycle hydrogen stream. In order to maintain maximum catalytic activity of the platinum-containing catalyst and to thereby effect not only maximum conversion of the hydrocarbon components to reformed hydrocarbons, but also to remove the sulfur-containing organic contaminants to a maximum degree, it is generally essential to substantially remove the hydrogen sulfide contaminant from the hydrogen recycle gas stream prior to recontacting the platinum catalyst with the resulting recycle gas. By means of the application of the process of this invention, the aforementioned recycle hydrogen stream or any other gas essentially inert to the present treating agent but contaminated with hydrogen sulfide may be treated with the separating agent herein provided to remove the hydrogen sulfide contaminant from the gas by means both economically and effectively applied.

In general the present purification process involves passing the contaminated stream in the presence of moisture through a purification zone containing a solid metal phosphate treating agent at a temperature and pressure sufficient to convert the metal phosphate at least in part to a metal sulfide and thereafter reducing the temperature maintained on the resulting metal sulfide suspension containing the mixture and the phosphoric acid resulting from the previous reaction of hydrogen sulfide with the metal phosphate salt to cause the regeneration of the metal phosphate salt, the release of hydrogen sulfide from the spent treating agent, and the removal of the latter contaminant from the process cycle. The removal of the hydrogen sulfide from the treating agent thus results in the regeneration of the metal phosphate salt into a form which may be recycled directly to the treating stage for reuse therein. It is also evident that the method accomplishes the separation and removal of hydrogen sulfide from the contaminated gas by a method which merely consumes heating, pumping and cooling utilities, without real consumption or loss of the reagents and reactants. Accordingly, the process may be operated on an economical basis and since the equilibrium reactions may be shifted in either direction to the extent required to effect complete removal of hydrogen sulfide, the process comprises an effective, flexible and economical means for accomplishing this purpose.

Typical metal phosphate salts utilized as the scavenging agent for hydrogen sulfide in the treatment of the contaminated gaseous feed stream are selected from the phosphates of metals in the right hand columns of groups I and II of the periodic table, including the ortho-, meta-, and pyro-phosphates, the polyphosphates and the mono and dibasic acid phosphates of copper, silver, zinc, cadmium and mercury, particularly the above phosphate salts of copper and silver, utilized individually or as an aggregate of two or more said salts in the same treating zone. These phosphate salts are substantially immiscible in both hot and cold water, but the presence of moisture in the treating zone is essential to their activity as treating agents. The one or more metal phosphate salts which comprise the treating agent may be utilized in the form of homogeneous granules packed into the treating zone or the indicated salts may be deposited upon suitable spacing materials, such as inert solid supports upon the surface of which the metal phosphate may be disposed by fusion or adhesion to form a heterogeneous composite. Typical of the latter supports, for example, are such solid refractory materials as silica gel, charcoal, alumina, kieselguhr, clay, resin particles, etc. The metal phosphate may also be dispersed in a suitable inert resinous or plastic material capable of maintaining the metal phosphate exposed to the action of the feed stock and the reagents involved in the present process. Thus, the metal phosphate in the form of a finely divided powder may be dispersed in liquid styrene and the latter dispersion polymerized to a solid, followed by crushing the polystyrene into smaller particles to a size suitable for packing into a treating vessel to thereby provide a fixed bed for use in the present process. Alternatively the phosphates may be used in the form of an aqueous suspension or slurry, which may be circulated countercurrently to the gas being treated.

Typical feed stocks which may be utilized in the present process for treatment with the metal phosphate treating agent to remove the hydrogen sulfide contaminant therefrom are generally selected from gaseous mixtures in which the gas to be recovered (that is the component of the mixture other than the hydrogen sulfide constituent thereof) is substantially inert to the action of the metal phosphate treating agent. One of the most common instances of a gas mixture contaminated with hydrogen sulfide is a recycle hydrogen stream, hereinbefore mentioned, the hydrogen sulfide contaminant being present therein in any commonly occurring concentration, generally not more than about 10% by volume of the combined gases. Such hydrogen-containing gases are best treated with the zinc or cadmium phosphates, to thereby avoid deposition of the metal by reaction with hydrogen, such as might occur with the phosphate of a metal below hydrogen in the electromotive series. Other typical feed stocks suitably treated in accordance with the present process include, for example, such mixtures as hydrogen sulfide-contaminated hydrocarbons, such as the light gaseous fraction formed in many petroleum conversion processes and which may comprise a mixture of two or more of such gases as hydrogen, carbon monoxide, carbon dioxide, methane, ethane, ethylene, propane, propylene, one or more of the various butane and butylene isomers, etc. The present process is also effective for treating highly diluted hydrogen sulfide-contaminated gas mixtures to remove the hydrogen sulfide contaminant therefrom, even if the contaminating hydrogen sulfide is present in small concentrations of a few parts per million.

The treating stage of the present process is effected at a temperature and pressure sufficient to shift the equilibrium in the reaction between hydrogen sulfide and the metal phosphate salt toward the formation of the metal sulfide and phosphoric acid. This equilibrium is represented for a monovalent metal phosphate selected from the indicated group by the following equation:

$$2M_3PO_4 + 3H_2S \rightleftharpoons 3M_2S + 2H_3PO_4$$

or if insufficient hydrogen sulfide is present to cause the equilibrium to shift completely in the direction of metal sulfide formation, as for example, when treating a contaminated gas mixture containing a small proportion of hydrogen sulfide, the equilibrium may be represented by one or more of the following equations:

$$M_2PO_4 + H_2S \rightleftharpoons MH_2PO_4 + M_2S$$

$$2M_3PO_4 + H_2S \rightleftharpoons 2M_2HPO_4 + M_2S$$

Any one or all three of the products and intermediates represented by the above equations may be present in the treating zone at the same time for any given treatment utilizing a monovalent metal phosphate, such as silver phosphate. In general, the equilibrium represented by the above equations will shift to the right side of the equations at elevated temperatures and the quantity of hydrogen sulfide dissolving in the water present within the treating zone will increase with elevated pressures, thereby also shifting the equilibrium to the compounds on the right side of the equilibrium equation. For example, at 12° C., a silver phosphate-silver sulfide-phosphoric acid mixture will attain equilibrium at a partial pressure of hydrogen sulfide of 125 mm. As the temperature is increased, the hydrogen sulfide equilibrium pressure declines and at 109° C., the conversion to silver sulfide is substantially complete and the partial pressure of hydrogen sulfide in the system at equilibrium is substantially zero. The foregoing relationships between the equilibrium pressure of hydrogen sulfide, metal phosphate and phosphoric acid at different temperatures enables the design of a process for separating hydrogen sulfide from inert gas mixtures, which process may be operated both efficiently and economically to produce a recovered inert gas product substantially free of hydrogen sulfide, while simultaneously permitting regeneration of the treating agent for continued reuse in the process. Thus, the gas stream contaminated with hydrogen sulfide may be contacted with a fixed bed of solid metal phosphate salt at an elevated temperature and at a sufficient pressure to maintain any moisture present in the system in substantially liquid phase. After the conversion of a substantial proportion of the metal phosphate salt to a metal sulfide, the resulting "spent" metal sulfide is transferred into a separate regeneration zone out of contact with additional hydrogen sulfide-contaminated feed stock wherein the pressure and temperature are reduced and the resulting released hydrogen sulfide is separately removed. Suitable "treating" temperatures and pressures may, for example, be within the range of from 50° to about 200° C. at from slightly superatmospheric pressures up to pressures not generally in excess of about 100 atmospheres, depending upon the structural limits of the apparatus in which the treating stage is effected. Regeneration is effected at lower temperatures and pressures than are maintained in the treating stage, although values for these factors are generally determined by the conditions required for establishing the equilibrium in each instance, conditions which may differ for each metal phosphate treating agent.

Alternatively, the flow of feed gas contaminated with hydrogen sulfide may be discontinued when the metal phosphate becomes substantially "spent," followed by reducing the temperature and pressure in the treating zone to cause the release of the hydrogen sulfide and regeneration of the metal phosphate. It is thus apparent that the contacting stage of the process wherein the feed gas is brought into contact with the solid metal phosphate salt is effective in one zone at relatively elevated temperature and pressure to thereby form phosphoric acid and a sulfided metal phosphate conversion product and after its formation the sulfided metal may be treated in situ within the treating zone or transferred, together with the resulting sulfided metal and the released phosphoric acid, into a separate regeneration zone maintained at a lower temperature and pressure wherein the sulfided metal is again reconverted to the metal phosphate salt. The shift of the treating agent from the contacting or treating zone to the regeneration zone and the recycle of the regenerated metal phosphate to the treating zone may be effected by a moving bed or slurry type of operation in which the treating agent is physically transferred from one zone to the other or the effect of such physical transfer may be obtained by providing two or more reaction vessels in which each vessel alternately functions as a treating zone and regeneration zone. This may be accomplished, for example, by alternating the reaction conditions to effect either treatment or regeneration, simultaneously alternating the introduction of the feed stream into the several vessels comprising the process flow.

The present process is an ionic reaction; accordingly, water is preferably present in contact with the metal phosphate treating agent as well as the sulfided metal resulting from contact of the metal phosphate with the hydrogen sulfide in order that the indicated conversions will result. The water present in contact with the treating agent not only provides a liquid phase transfer medium in which hydrogen sulfide dissolves and enters into reaction with the treating agent, but also provides an ionizing medium, essential to the formation of phosphoric acid as a result of the contact of hydrogen sulfide with the metal phosphate salt.

The present process may be operated for the purpose of merely reducing the hydrogen sulfide content of a contaminated gas stream, without necessarily eliminating completely the hydrogen sulfide therefrom, although the removal of hydrogen sulfide completely from the gas residue may be effected, if desired, depending upon the temperature and pressure conditions maintained in the treating zone during the purification treatment provided herein, and the size of the phosphate bed relative to the feed stream.

The present invention will be further illustrated with respect to several of its specific embodiments in the following examples which, however, are not intended to restrict the generally broad scope of the invention necessarily in accordance with the process conditions, reagents, or other variables embodied in said examples.

EXAMPLE I

Coarse particles of alumina are prepared by precipitating aluminum hydroxide from an aqueous solution of aluminum chloride by combining an aqueous solution of an aluminum salt with ammonium hydroxide. For this purpose separate 5% aqueous solutions of ammonium hydroxide and aluminum chloride were mixed together, stoichiometric quantities corresponding to three moles of ammonium hydroxide per mole of aluminum chloride being added to the mixer. The two streams of aqueous reagents are continuously mixed by rapidly stirring the resulting mixture of the two streams with a motor-driven paddle stirrer. An insoluble precipitate of aluminum hydroxide forms immediately upon mixing which is continuously filtered, the filter cake collecting on the rotary filter being continuously washed with distilled water to remove a major portion of the ammonium chloride from the filter cake. After removing a major portion of the water by suction, the filter cake is dried at a temperature of 300° C. for five hours and thereafter ground into a finely divided powder and pilled into cylindrical granules ⅛" x ⅛". The resulting pellets are thereafter calcined at 550° for ten hours, forming porous pellets of sufficient structural rigidity to withstand breakage and attrition when poured from one vessel into another. Alumina pellets prepared in accordance with the foregoing procedure are converted to a treating agent for removal of hydrogen sulfide from an inert gas by suspending the alumina pellets in 21.5% ammonium hydroxide (aqueous solution of approximately 0.92 specific gravity) containing 5% by weight of silver pyrophosphate. The silver phosphate solution in ammonium hydroxide enters the porous structure of the alumina particles, immediately upon contact of the solid alumina with the ammonium hydroxide solution of the silver phosphate. After standing for three hours in the above solution, the excess supernatant liquor is drained from the solid particles, the latter dried in an oven at 350° C. and utilized as such in the following treating process to remove hydrogen sulfide from a methane stream contaminated with hydrogen sulfide.

In a similar series of steps, porous alumina particles are suffused with ammonium hydroxide solutions of silver orthophosphate, copper pyrophosphate, zinc metaphosphate and mercuric pyrophosphate and with zinc phosphate to prepare the corresponding alumina-supported metal phosphate pellets. In each instance the metal phosphate salt concentration in the ammonium hydroxide solution is sufficient to provide an alumina-supported metal phosphate containing from 3% to 8% of the metal phosphate deposited on the alumina particles in intimate association therewith. These prepared metal phosphate-alumina composites are charged into two vertical sections of a 2-inch (I.D.) stainless steel pipe, each having a gaseous feed inlet connected to the bottom of the resulting column, and a purified, recovered gas stream outlet connected to the top of the vertical column, each section of 2-inch pipe being 3 feet in length and containing approximately 110 cubic inches of metal phosphate-alumina composite pellets. Prior to being charged into the pipe sections, the composite particles are moistened with sufficient liquid water to wet the surfaces of the particles, the latter thereafter being charged into the pipe sections in loose random distribution therein. Each column is surrounded with an electrically heated mantle thermostatically controlled to maintain the bed of particles at a maximum temperature of 120° C. and when not heated, the beds cool to approximately room temperature, about 25° C.

A stream of gas contaminated with 300 p.p.m. of hydrogen sulfide at various temperatures and pressures, indicated in the following Table I, is charged into the bottom of one of the pipe sections containing the metal sulfide-alumina composite, the gas mixture flowing upwardly through the bed of contact particles at a rate of 3 s.c.f./minute for a period of 35 minutes. Samples of effluent gas are withdrawn periodically and analyzed for residual hydrogen sulfide content. Following the above processing period, the gas mixture is diverted into the second of the two vertical columns, the first column thereafter being reduced in pressure and temperature to the levels indicated in the following Table I for desorption of hydrogen sulfide therefrom. The hydrogen sulfide released from the solid sorbent is collected and analyzed to determine its composition. In each case, the hydrogen sulfide released after sweeping the residual feed gas from the column (about 10 minutes) is substantially pure $H_2S$ admixed with the sweeper gas (nitrogen).

After 35 minutes of processing the gas stream through column 2 and after regeneration of column 1, the gas mixture is again diverted from column 2 into column 1, column 2 thereafter being regenerated in the manner indicated for column 1. The absorbent utilized in each case, the process conditions and the composition of the effluent gas product for each of the indicated absorbents are tabulated in the following Table I.

Table 1.—*Absorption of hydrogen sulfide from methane by passing mixture over alumina-supported metal phosphates*

| Metal phosphate on alumina, weight percent | $H_2S$ content of effluent gas after 10 minutes, p.p.m. | $H_2S$ content of effluent gas after 20 minutes, p.p.m. | $H_2S$ content of effluent gas after 30 minutes, p.p.m. | $H_2S$ content of effluent gas after 35 minutes, p.p.m. |
|---|---|---|---|---|
| 2.8% $Ag_3PO_4$[-1] | 0 | 0 | 3 | 12 |
| 3.5% $Hg_3PO_4$[-1] | 0 | 0 | 0 | 0 |
| 3.5% $Ag_3PO_4$[-2] | 0 | 0 | 0 | 2 |
| 3.2% $Cu_3(PO_4)_2$[-1] | 0 | 0 | 0 | 3 |
| 4.6% $Cu_3(PO_4)_2$[-1] | 0 | 0 | 0 | 0 |
| 1.4% $Cu_3(PO_4)_2$[-1] | 0 | 1 | 2 | 5 |
| 3.2% $Zn_3(PO_4)_2$[-2, 3] | 0 | 1 | 3 | 7 |
| 3.2% $Zn_3(PO_4)_2$[-1, 3] | 0 | 0 | 2 | 4 |
| 3.8% $Cd_3(PO_4)_2$[-1, 3] | 0 | 0 | 0 | 3 |
| 4.8% $Hg_3PO_4$[-1] | 0 | 0 | 0 | 0 |
| 5.2% $Ca_3(PO_4)_2$ | 140 | 290 | 300 | 300 |

NOTE—([-1]) Absorption at 120° C. and at 600 lbs./in.² pressure. Desorption at about 25° C. and at atmospheric pressure. ([-2]) Absorption at 105° C. and at 750 lbs./in.² pressure. Desorption at about 40° C. and at atmospheric pressure. ([-3]) Carrier gas was hydrogen instead of methane.

It will be noted from the above indicated results that the alumina-supported metal phosphates remain active and reduce the hydrogen sulfide content of the recovered effluent gas until a substantial proportion of the metal phosphate has been converted to metal sulfide deactivation products. It will also be noted that of the above metal phosphates in which the metals are selected from the elements of group II of the periodic table, calcium phosphate which is a salt of an element comprising the left hand column of group II is substantially ineffective for the indicated process while the elements of the right hand columns of groups I and II are effective for the indicated purpose.

We claim as our invention:

1. A process for removing hydrogen sulfide from a mixture of the same with a gas which is substantially inert to the treating agent hereinafter specified which comprises contacting the gas mixture with a treating agent comprising a phosphate salt of a metal selected from the group consisting of copper, silver, zinc, cadmium and mercury at a temperature and pressure and in the presence of an amount of water sufficient to convert a substantial portion, at least, of said metal phosphate salt to the sulfide salt of said metal and to phosphoric acid and, thereafter, separately treating the resulting conversion product at a reduced temperature and pressure, compared to the contacting step, sufficient to regenerate said metal phosphate separating agent and release hydrogen sulfide from the conversion product, withdrawing said hydrogen sulfide as an effluent from the latter step and recycling regenerated metal phosphate salt to the first mentioned contacting step.

2. The process of claim 1 further characterized in that said metal phosphate is supported on a substantially inert solid.

3. The process of claim 2 further characterized in that said inert solid is alumina.

4. The process of claim 2 further characterized in that said solid is charcoal.

5. The process of claim 1 further characterized in that said metal phosphate is silver phosphate, said contacting step is effected at a temperature in excess of 100° C. and at a superatmospheric pressure and the regeneration step is effected at a lower temperature and pressure.

6. The process of claim 1 further characterized in that said metal phosphate salt is a copper phosphate.

7. The process of claim 1 further characterized in that the gas mixture is contacted with said treating agent at a temperature of from about 50° C. to about 200° C.

References Cited in the file of this patent

UNITED STATES PATENTS

| 2,375,041 | Schmerling et al. | May 1, 1945 |
| 2,554,819 | Eads | May 29, 1951 |

OTHER REFERENCES

Mellor: "A Comprehensive Treatise on Inorganic and Theoretical Chemistry," vol. 10, page 137, Longmans Green and Co., New York, N.Y., 1930.